(12) United States Patent
Casler

(10) Patent No.: US 7,034,999 B1
(45) Date of Patent: Apr. 25, 2006

(54) HEMISPHERIC LENS FOR A REMOTE-CONTROLLED RETAIL ELECTRONIC ENTERTAINMENT DEVICE

(76) Inventor: Christopher L. Casler, 186 E. Howard Ave., Eugene, OR (US) 97404

( * ) Notice: Subject to any disclaimer, the term of this patent is extended or adjusted under 35 U.S.C. 154(b) by 317 days.

(21) Appl. No.: 09/995,933

(22) Filed: Nov. 28, 2001

Related U.S. Application Data

(63) Continuation-in-part of application No. 09/468,476, filed on Dec. 21, 1999, which is a continuation of application No. 09/162,127, filed on Sep. 29, 1998, now abandoned.

(51) Int. Cl.
    *G02B 13/14* (2006.01)
(52) U.S. Cl. .................................. 359/356
(58) Field of Classification Search ............... 359/356, 359/725, 819, 827, 802, 809, 810; 250/338.1, 250/336.1, 221, 222.1; 341/176
See application file for complete search history.

(56) References Cited

U.S. PATENT DOCUMENTS

| | | | |
|---|---|---|---|
| 3,937,949 A | | 2/1976 | Ishikawa |
| 4,889,409 A | | 12/1989 | Atcheson |
| 4,912,880 A | | 4/1990 | Haddock et al. |
| 4,921,330 A | | 5/1990 | Takahashi et al. |
| 5,036,188 A | * | 7/1991 | Keitoku .................. 250/216 |
| 5,103,108 A | | 4/1992 | Crimmins |
| 5,359,189 A | | 10/1994 | Savicki |
| 5,623,143 A | * | 4/1997 | Takamatsu ............... 250/239 |
| 5,633,498 A | | 5/1997 | Savicki |
| 5,773,819 A | | 6/1998 | Ramer |
| 6,402,327 B1 | * | 6/2002 | Ogata ...................... 359/516 |

FOREIGN PATENT DOCUMENTS

| | | | |
|---|---|---|---|
| EP | 0 103 301 | | 7/1987 |
| EP | 0 587 075 | | 4/1997 |
| GB | 1500495 A | * | 2/1978 |

* cited by examiner

*Primary Examiner*—Mark A. Robinson
*Assistant Examiner*—Lee Fineman
(74) *Attorney, Agent, or Firm*—David S. Alavi

(57) ABSTRACT

A retail purchaser of a previously-purchased remote-controlled retail electronic entertainment device may retrofit said remote-controlled device to provide an increased acceptance angle for an infrared receiver thereof by performing the steps of: a) purchasing, on a retail basis, a hemispheric lens; and b) securing the hemispheric lens to the face of the previously-purchased remote-controlled device over the infrared receiver thereof. Retrofitting of a previously-purchased remote-controlled retail electronic entertainment device by a retail purchaser of said previously-purchased device to provide an increased acceptance angle for an infrared receiver thereof may be enabled by performing the steps of: a) selling, on a retail basis to the retail purchaser of the previously-purchased device, a hemispheric lens; and b) instructing the retail purchaser to secure the hemispheric lens to the face of said remote-controlled device over the infrared receiver thereof.

6 Claims, 5 Drawing Sheets

HEMISPHERIC LENS FOR A REMOTE-CONTROLLED RETAIL ELECTRONIC ENTERTAINMENT DEVICE

RELATED APPLICATIONS

This application is a continuation-in-part of prior-filed co-pending non-provisional application Ser. No. 09/468,476, filed Dec. 21, 1999, which is a continuation of prior-filed non-provisional application Ser. No. 09/162,127, filed Sep. 29, 1998, now abandoned. Both of said parent applications are hereby incorporated by reference as if fully set forth herein.

FIELD OF THE INVENTION

The present invention relates generally to light concentrators and more particularly to a hemispheric lens for an infrared remote control receiver of a remote-controlled retail electronic entertainment device.

BACKGROUND

As digital and electronic systems have grown smaller, portability has become an ever more important consideration in their design. An important component of portability is wireless connectivity, that is, the capability of digital devices to communicate with each other without being connected by cables and/or wires. Infrared radiation (IR) has long been used to achieve wireless connectivity. An example is a remote control used with a remote-controlled retail electronic entertainment device, such as a video device (a television, a video cassette recorder, a video cassette player, a DVD player, a DVD recorder, a cable television receiver, a satellite television receiver, and so forth) or an audio device (a radio, a stereo, a hi-fi system, an audio cassette player, an audio cassette recorder, an audio CD player, an audio CD recorder, a home theatre system, a surround-sound system, an MP3 player, an MP3 recorder, a DVD-audio player, and a DVD-audio recorder, and so forth). Such a remote control works by sending infrared signals from the remote control to a receiver on the remote-controlled electronic device. A distinction exists between directed IR remote controls which must be generally aimed at the infrared receiver along a line-of-sight, and non-directed IR remote controls that do not need to be aimed. Prior art non-directed remote controls have worked by simply producing an IR signal so powerful that it may be used essentially anywhere within an enclosed space containing the non-directed remote control and the corresponding remote-controlled device; the inherent disadvantage is increased size and energy consumption to generate the IR beam and its associated cost.

Directed remote controls, while requiring less power and therefore being smaller and less expensive, also have several disadvantages associated with their use. One shortcoming associated with directed remote controls is that they must be pointed at the remote-controlled electronic device along an unobstructed line-of-sight. If the directed remote control is portable (as is generally the case with remote-controlled retail electronic entertainment devices), the remote control must be constantly re-aimed after being moved. Additionally, the effectiveness of a directed remote control is limited with respect to the angle-of-incidence of an infrared signal with respect to an infrared receiver on the remote-controlled electronic device.

In many remote-controlled retail electronic entertainment devices, the IR receiver is flush with a device front panel or even recessed within the front panel for protection and/or concealment. In either case, the range of incident angles over which a directed remote control is usable will be limited. It may therefore be desirable that the remote-controlled device be provided with a lens for increasing the range of incident angles over which the directed remote control may be used. In particular, it is desirable to provide a lens for the IR receiver of a remote-controlled retail electronic entertainment device that may be installed on and used with a previously-purchased device (i.e., as an upgrade or retrofit), so that the retail purchaser need not purchase a new device.

Concentrators and/or lenses are a commonly-used tool for concentrating infrared radiation in preferred directions when using a directed remote control. For example, U.S. Pat. No. 5,633,498 issued May 27, 1997 to Savicki discloses an infrared collector that concentrates infrared radiation received from some directions more than others. U.S. Pat. No. 5,359,189 issued Oct. 15, 1994 to Savicki discloses an infrared collector having a flattened convex surface. The collector employs a non-directive concentrator to concentrate infrared radiation received in the collector on a detector. U.S. Pat. No. 5,773,819 issued Jun. 30, 1998 to Ramer et al. discloses a hemispherical light detector for improving a uniformity of detection response across a large range of incident angles. U.S. Pat. No. 3,937,949 issued Feb. 10, 1976 to Ishikawa et al. discloses an optical remote control apparatus employing a light scattering plate for broadening the aiming tolerance of a light beam transmitter. U.S. Pat. No. 5,103,108 issued Apr. 7, 1992 to Crimmins discloses an infrared communications system including one or more IR receivers having transparent hemispherical lenses and/or transparent hemispherical enclosures.

However, none of the aforementioned patents shows or teaches the use of a lens or concentrator with a remote-controlled retail electronic entertainment device, such as a video device (a television, a video cassette recorder, a video cassette player, a DVD player, a DVD recorder, a cable television receiver, a satellite television receiver, and so forth) or an audio device (a radio, a stereo, a hi-fi system, an audio cassette player, an audio cassette recorder, an audio CD player, an audio CD recorder, a home theatre system, a surround-sound system, an MP3 player, an MP3 recorder, a DVD-audio player, and a DVD-audio recorder, and so forth). Neither do any of the aforementioned patents show or teach means or methods for attaching a lens or concentrator to the outside of a previously-purchased remote-controlled retail electronic entertainment device having an IR receiver. None of the aforementioned patents shows or teaches a method, to be performed by a retail purchaser of a previously-purchased remote-controlled retail electronic entertainment device, for upgrading the electronic entertainment device to include a lens or concentrator. None of the aforementioned patents shows or teaches a method for enabling a retail purchaser of a previously-purchased remote-controlled retail electronic entertainment device to upgrade the previously-purchased remote-controlled retail electronic entertainment device to include a lens or concentrator. None of the aforementioned patents, taken singularly or in combination, is seen to disclose the instant invention as claimed.

SUMMARY

Certain aspects of the present invention may overcome one or more aforementioned drawbacks of the previous art and/or advance the state-of-the-art of infrared (IR) remote-controlled retail electronic entertainment devices, and in addition may meet one or more of the following objects:

To provide a lens and methods of use therefor for increasing the range of incident angles over which a directed IR remote control may be used with a remote-controlled retail electronic entertainment device;

To provide a lens and methods of use therefor for increasing the usable angular range of the directed remote control that may be installed on and used with a previously-purchased remote-controlled retail electronic entertainment device;

To provide a lens and methods of use therefor for increasing the usable angular range of the directed remote control that may be installed on a previously-purchased remote-controlled retail electronic entertainment device by a retail purchaser of the device;

To provide a lens and methods of use therefor wherein the lens may be installed on a surface of the retail electronic entertainment device over an IR receiver thereof;

To provide a lens and methods of use therefor wherein the lens may be installed on a surface of the retail electronic entertainment device over an IR receiver thereof by means of adhesive material;

To provide a lens and methods of use therefor wherein the lens may be installed on a surface of the retail electronic entertainment device over an IR receiver thereof by means of adhesive material provided on the lens;

To provide a method, performed by a retail purchaser of a previously-purchased remote-controlled retail electronic entertainment device, for retrofitting said remote-controlled device to provide an increased acceptance angle for an infrared receiver thereof; and To provide a method for enabling a retail purchaser of a previously-purchased remote-controlled retail electronic entertainment device to retro-fit said remote-controlled device to provide an increased acceptance angle for an infrared receiver thereof.

One or more of the foregoing objects may be achieved in the present invention by a method, performed by a retail purchaser of a previously-purchased remote-controlled retail electronic entertainment device, for retrofitting said remote-controlled device to provide an increased acceptance angle for an infrared receiver thereof, the method comprising the steps of: a) purchasing, on a retail basis, a hemispheric lens, the hemispheric lens comprising a lens body, the lens body being fabricated from a dielectric material substantially transparent at an infrared wavelength received by the infrared receiver, the lens body having a substantially hemispheric convex outer surface, a substantially hemispheric concave inner surface, a substantially flat annular surface connecting the inner and outer hemispheric surfaces, and an adhesive layer provided on the annular surface for securing the lens to a face of the remote-controlled retail electronic entertainment device over the infrared receiver thereof; and b) securing the hemispheric lens to the face of the previously-purchased remote-controlled retail electronic entertainment device over the infrared receiver thereof, thereby increasing the acceptance angle over which infrared remote control signals may be received by the infrared receiver.

One or more of the foregoing objects may be achieved in the present invention by a method for enabling a retail purchaser of a previously-purchased remote-controlled retail electronic entertainment device to retro-fit said remote-controlled device to provide an increased acceptance angle for an infrared receiver thereof, comprising the steps of: a) selling, on a retail basis to the retail purchaser of the previously-purchased remote-controlled retail electronic entertainment device, a hemispheric lens, the hemispheric lens comprising a lens body, the lens body being fabricated from a dielectric material substantially transparent at an infrared wavelength received by the infrared receiver, the lens body having a substantially hemispheric convex outer surface, a substantially hemispheric concave inner surface, a substantially flat annular surface connecting the inner and outer hemispheric surfaces, and an adhesive layer provided on the annular surface for securing the lens to a face of the remote-controlled retail electronic entertainment device over the infrared receiver thereof; and b) instructing the retail purchaser of the previously-purchased remote-controlled retail electronic entertainment device to secure the hemispheric lens to the face of said remote-controlled device over the infrared receiver thereof, thereby increasing the acceptance angle over which infrared remote control signals may be received by the infrared receiver.

Additional objects and advantages of the present invention may become apparent upon referring to the preferred and alternative embodiments of the present invention as illustrated in the drawings and described in the following written description and/or claims.

DETAILED DESCRIPTION OF PREFERRED AND ALTERNATIVE EMBODIMENTS

For purposes of the present written description and/or claims, "angle-of-incidence" or equivalently "incident angle" shall denote the angle between a vector normal to a surface and a vector describing the propagation of a light ray relative to that surface. The term shall be applied to the face of a remote-controlled device, or may be applied to a lens, detector, or receiver surface. The terms "acceptance angle", "useful angular range", and the like shall denote the range of angles of rays emanating from an IR receiver and corresponding to directions for a remote control that may be successfully used to send commands to a remote-controlled device. For purposes of the present written description and/or claims, "retail electronic entertainment device" shall denote any audio and/or video electronic entertainment device available for retail purchase by a retail purchaser, and may include a television, a video cassette recorder, a video cassette player, a DVD player, a DVD recorder, a cable television receiver, a satellite television receiver, a radio, a stereo, a hi-fi system, an audio cassette player, an audio cassette recorder, an audio CD player, an audio CD recorder, a home theatre system, a surround-sound system, an MP3 player, an MP3 recorder, a DVD-audio player, and a DVD-audio recorder, and so forth. In addition, devices providing similar audio and/or video electronic entertainment functions but differing in the recording medium employed, transmitting/receiving medium employed, audio and/or video content format employed, audio and/or video encoding format employed, and so on, may nevertheless be construed as falling within the scope of inventive concepts disclosed and/or claimed herein.

Figure 1:
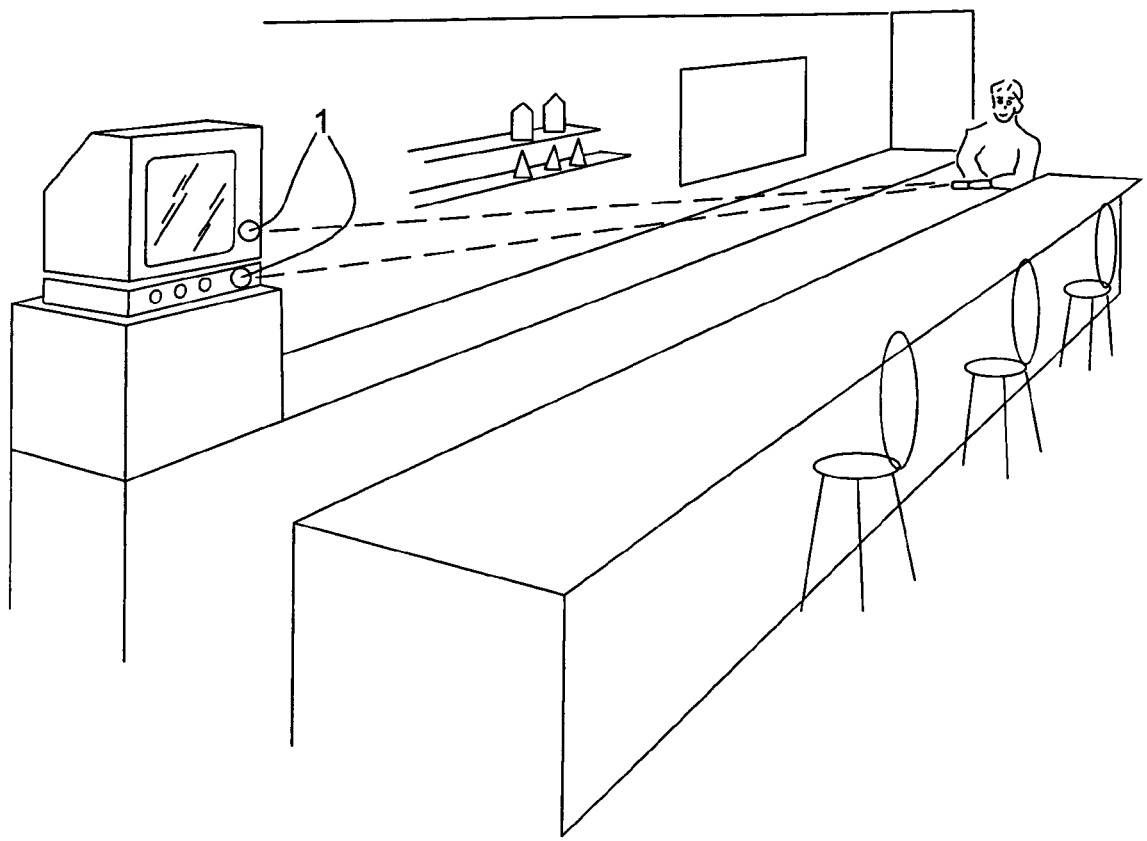
FIG. 1 is an environmental, perspective view of a hemispheric lens shown in use with a TV/VCR assembly with a remote control.

Shown in FIG. 1 is an environmental perspective view of a hemispheric lens 1 according to the present invention. FIG. 1 illustrates a typical application for the hemispheric lens 1, used to enable a user to effectively use a remote-controlled electronic entertainment device over a relatively broader angular range than the usable angular range of the electronic device without lens 1. Such applications may include a bar or restaurant environment where the user of the remote control, typically a bartender, may be working in areas nearly at right angles to a viewing direction normal to the viewing screen of a TV (near where an IR receiver would typically be located), and at substantial distances from the TV, because of an elevated location of the TV and/or its lack of proximity to the work areas.

Figure 2:
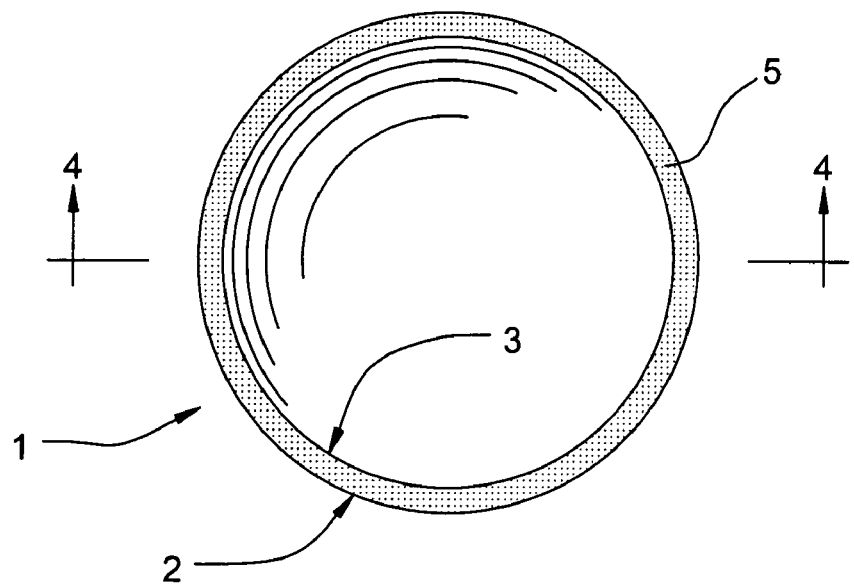
FIG. 2 is a bottom view of a hemispheric lens according to the present invention.
Figure 3:
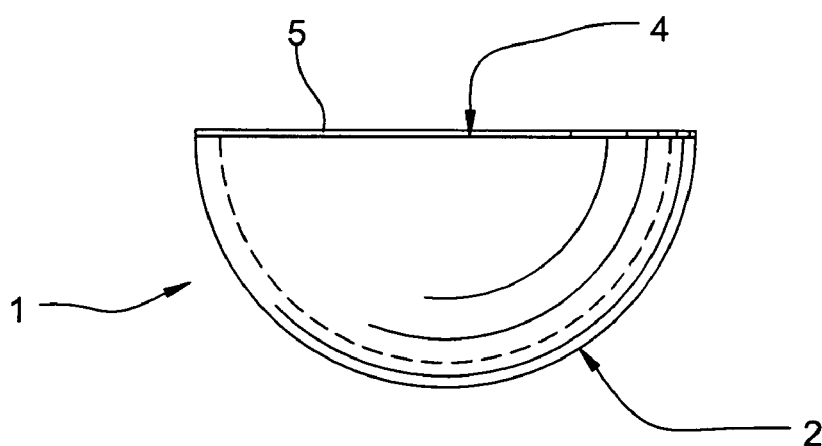
FIG. 3 is a side view of the hemispheric lens according to the present invention.
Figure 4:
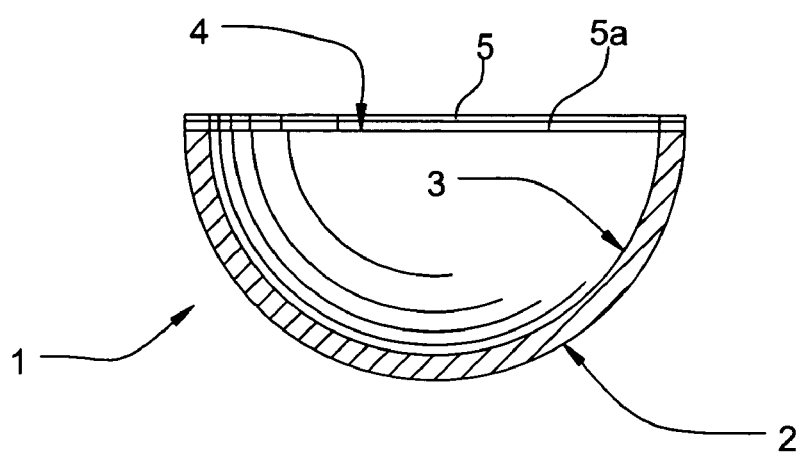
FIG. 4 is a cross-sectional view of the hemispheric lens according to the present invention.

Details relating to the construction of the hemispheric lens 1 are described with reference to FIGS. 2, 3, and 4. The hemispheric lens 1 preferably comprises a hemispherical shell structure having an outer convex substantially hemispherical surface 2, an inner concave substantially hemispherical surface 3, and a substantially flat annular surface 4 connecting outer surface 2 and inner surface 3. Lens 1 may preferably be fabricated from plastic (such as acrylic plastic, for example), glass, or any other suitable dielectric material substantially transparent to the IR wavelength range used for controlling the remote-controlled electronic device with the IR remote control. Annular surface 4 may be further provided with an adhesive layer 5 for attaching the lens to a face of the remote-controlled device over an IR receiver thereon. The lens may be provided with an annular piece of double-sided tape 5a which includes adhesive layer 5 thereon. Double-sided tape 5a may be further provided with a removable backing layer for protecting the adhesive layer 5 and which may be removed prior to installation of lens 1 on the remote-controlled device. Any other type and/or configuration of adhesive layer 5, or other means for securing lens 1 to a remote-controlled device, may be employed without departing from inventive concepts disclosed and/or claimed herein. Lens 1 may have an outer hemisphere diameter of about ½ inch and an inner hemisphere diameter of about ⅜ inch to correspond approximately to the diameter of an IR receiver of a typical remote-controlled retail electronic entertainment device. Other diameters may be chosen as appropriate for a particular IR receiver. The hemispheric lens should also preferably have a substantially smooth finish and be substantially free of defects, for reducing scattering and/or refraction of IR radiation in unintended directions.

A preferred method of use for lens 1 is for a retail purchaser of a previously-purchased remote-controlled retail electronic entertainment device to 1) purchase lens 1 on a retail basis and then 2) secure lens 1 in place on a face of the remote-controlled device over the IR receiver thereof (i.e., as an upgrade or retrofit). In this way, the angular field or range over which the remote control may be used is increased (described in further detail hereinbelow) without the need for extensive modifications, significant cost, downtime, and/or need to purchase a new retail electronic entertainment device or remote control therefor. A preferred method for enabling such an upgrade or retrofit includes the steps of 1) selling lens 1 on a retail basis to a retail purchaser of the previously-purchased remote-controlled device and 2) instructing the retail purchaser to secure lens 1 in place on the face of the remote-controlled device over the IR receiver thereof.

Figure 5:
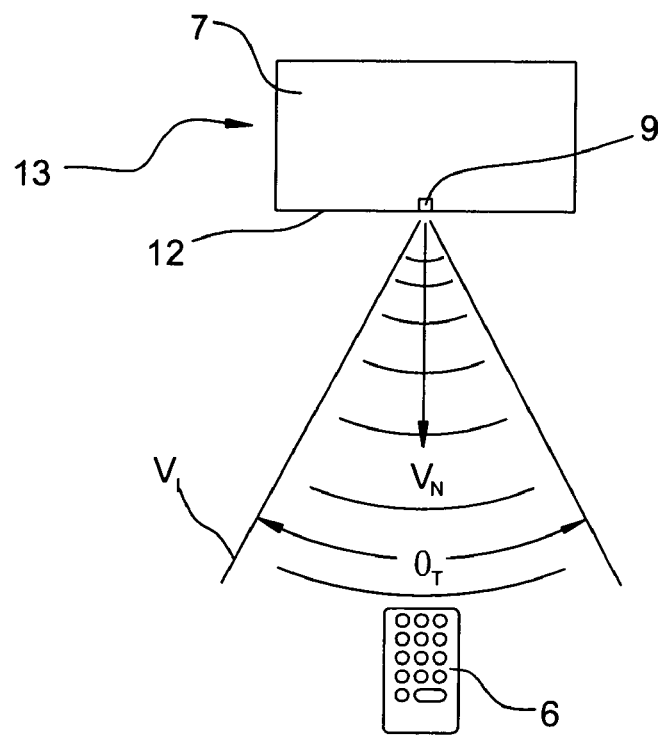
FIG. 5 shows a top view of a the usable angular field of a remote control without a lens according to the present invention.
Figure 6:
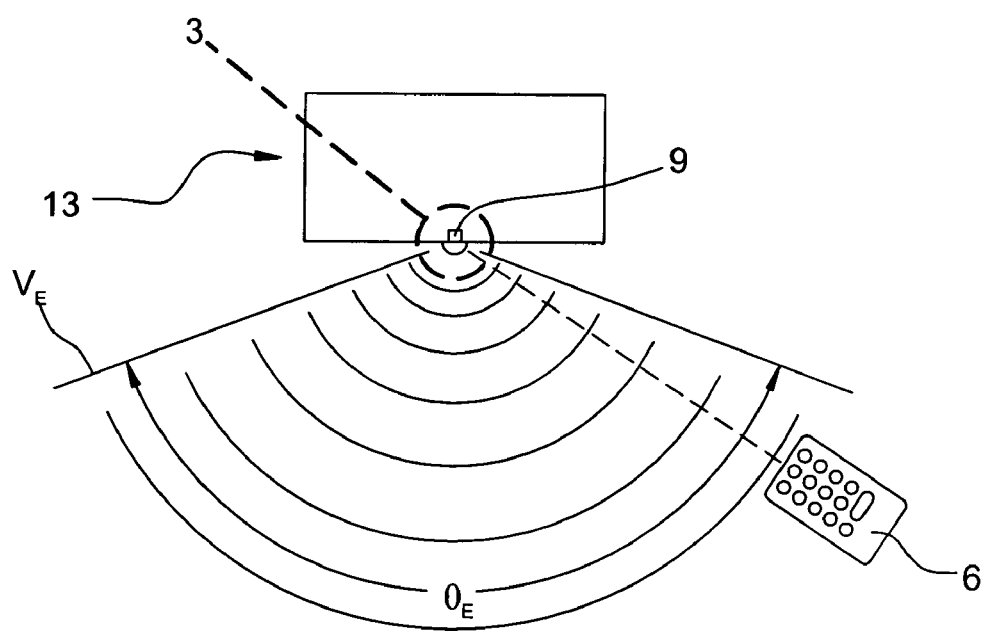
FIG. 6 shows a top view of an increased usable angular field of a remote control when used with a lens according to the present invention.
Figure 7:
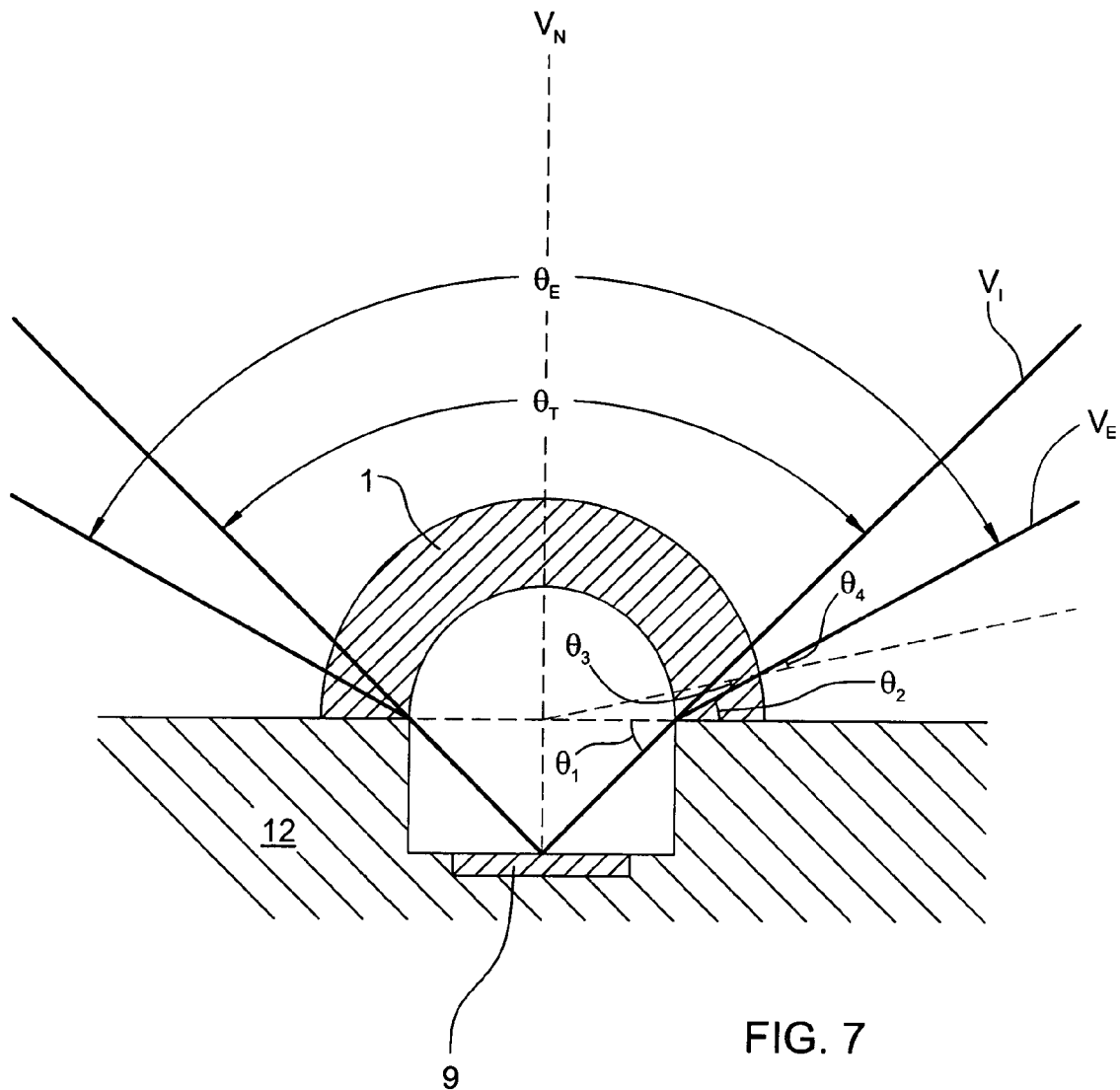
FIG. 7 shows a determination of the usable angular field both with and without a lens according to the present invention.
Figure 8:
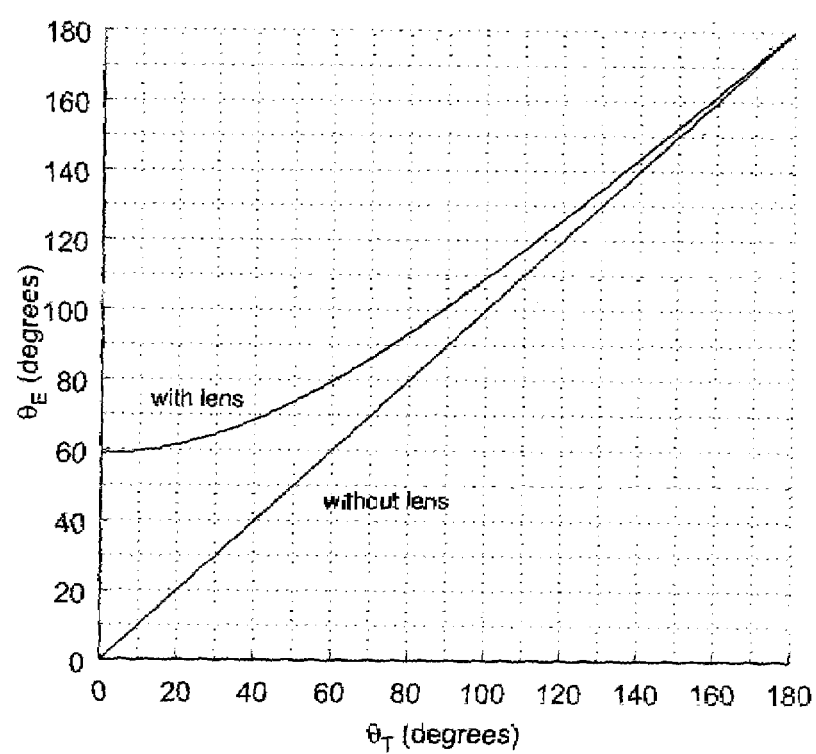
FIG. 8 is a graph comparing the usable angular fields determined according to FIG. 7.

The IR receivers of many remote-controlled electronic entertainment devices are typically flush with or recessed relative to a face of a housing for the electronic device, often restricting the useful angular range of the remote control. The lens of the present invention and methods for use thereof enable a retail purchaser of a previously-purchased retail electronic entertainment device to expand the useful angular range of such a device as a retro-fit or upgrade. The function of the present invention can best be understood in terms of ordinary refraction described by Snell's Law. Shown in FIG. 5 is a remote-controlled electronic device 13 defined by a housing 7, an infrared detector 9 housed in a recess in front wall 12 of the housing 7, a planar lens (i.e., a window; not shown) placed approximately flush in the front wall 12 of the housing 7 and covering the recess and detector therein, and a remote control device 6. Also shown is an angular range $\theta_T$ defining the maximum angle (without lens 1) for which directional remote control 6 can be effectively used for transmitting infrared communication signals to the infrared detector 9 housed in the recess of front wall 12 of the remotely-controlled electronic device 6. Outside this angular range, the remote control 6 is ineffective in communicating with the infrared detector 9. The angular range $\theta_T$ may be approximately calculated by determining the maximum angle of ray $V_I$ from the normal vector $V_N$ as shown in FIG. 7, where $\theta_T$ is determined by the depth and width of the recess and the maximum angle from normal for the ray $V_I$ which may propagate from the center of IR detector 9 out of the recess. Similarly, FIG. 6 illustrates an angular range $\theta_E$ defined as the maximum angular range for which the remote control device 6 may be effectively used when hemispheric lens 1 is placed in front of infrared detector 9. As shown, the expanded angular range $\theta_E$ is substantially greater than the angular range $\theta_T$ obtained without hemispheric lens 1. This expanded angular range $\theta_E$ may be approximately determined by using Snell's Law to determine the maximum angle for a ray $V_E$ to propagate through lens 1 from the center of detector 9 and out of the recess, as illustrated in FIG. 7. Calculated values for $\theta_E$ with lens 1 versus the equivalent $\theta_T$ without lens 1 are plotted in FIG. 8, for lens 1 having an inner radius equal to the radius of the recess, an outer radius 1.33 times the inner radius, and a refractive index of 1.5. These very simple calculations show the general manner of functioning of lens 1 as a function of the depth of the recess, while more involved calculations would be needed to more exactly account for factors such as the detector size, the angle of the receiver 9 and the recess with respect to the direction of travel of the IR radiation, and the spatial properties of the IR beam from remote control 6. For example, FIG. 8 indicates that for a receiver flush with the front wall 12 of the device (i.e., $\theta_T$=180°), both configurations (with or without lens 1) would work equally well. However, this represents IR radiation traveling parallel to the surface of detector 9 without lens 1, which would clearly result in little or no detected control signal. Addition of lens 1 should significantly increase the detected control signal level, since most of the surface of lens 1 would not be parallel to the direction of travel of the IR, and refraction at the spherical surfaces of lens 1 could direct some of the IR onto receiver 9. Calculations of this sort may be performed to determine the optimal hemispheric lens for a particular IR receiver configuration without departing from inventive concepts disclosed and/or claimed herein.

The present invention has been set forth in the forms of its preferred and alternative embodiments. It is nevertheless intended that modifications to the disclosed hemispherical lens and methods of use thereof may be made without departing from inventive concepts disclosed and/or claimed herein.

What is claimed is:

1. A method, performed by a retail purchaser of a previously-purchased remote-controlled retail electronic entertainment device, for retro-fitting said remote-controlled device to provide an increased acceptance angle for an infrared receiver thereof, the method comprising the steps of:

purchasing, on a retail basis and subsequent to a previous purchase of said remote-controlled device, a hemispheric lens, the hemispheric lens comprising a lens body, the lens body being fabricated from a dielectric material substantially transparent at an infrared wavelength received by the infrared receiver, the lens body having a substantially hemispheric convex outer surface, a substantially hemispheric concave inner surface, a substantially flat annular surface connecting the inner and outer hemispheric surfaces, and an adhesive layer comprising double-sided adhesive tape provided on the annular surface for securing the lens to a face of the remote-controlled retail electronic entertainment device over the infrared receiver thereof; and after purchasing the hemispheric lens, securing the hemispheric lens to the face of the previously-purchased remote-controlled retail electronic entertainment device over the infrared receiver thereof, thereby increasing the acceptance angle over which infrared remote control signals may be received by the infrared receiver, wherein the remote-controlled retail electronic entertainment device is a television, a video cassette recorder, a video cassette player, a DVD player, a DVD recorder, a cable television receiver, a satellite television receiver, a radio, a stereo, a hi-fi system, an audio cassette player, an audio cassette recorder, an audio CD player, an audio CD recorder, a home theatre system, a surround-sound system, an MP3 player, an MP3 recorder, a DVD-audio player, or a DVD-audio recorder.

2. The method of claim 1, wherein the dielectric material is substantially clear acrylic plastic.

3. The method of claim 2, wherein the lens body hemispheric inner surface is about ⅜ inch in diameter and the lens body hemispheric outer surface is about ½ inch in diameter.

4. A method for enabling a retail purchaser of a previously-purchased remote-controlled retail electronic entertainment device to retro-fit said remote-controlled device to provide an increased acceptance angle for an infrared receiver thereof, the method comprising the steps of:

selling, on a retail basis to the retail purchaser of the previously-purchased remote-controlled retail electronic entertainment device and subsequent to a previous purchase thereof, a hemispheric lens, the hemispheric lens comprising a lens body, the lens body being fabricated from a dielectric material substantially transparent at an infrared wavelength received by the infrared receiver, the lens body having a substantially hemispheric convex outer surface, a substantially hemispheric concave inner surface, a substantially flat annular surface connecting the inner and outer hemispheric surfaces, and an adhesive layer comprising double-sided adhesive tape provided on the annular surface for securing the lens to a face of the remote-controlled retail electronic entertainment device over the infrared receiver thereof; and instructing the retail purchaser of the previously-purchased remote-controlled retail electronic entertainment device to secure the hemispheric lens to the face of said remote-controlled device over the infrared receiver thereof, thereby increasing the acceptance angle over which infrared remote control signals may be received by the infrared receiver, wherein the remote-controlled retail electronic entertainment device is a television, a video cassette recorder, a video cassette player, a DVD player, a DVD recorder, a cable television receiver, a satellite television receiver, a radio, a stereo, a hi-fi system, an audio cassette player, an audio cassette recorder, an audio CD player, an audio CD recorder, a home theatre system, a surround-sound system, an MP3 player, an MP3 recorder, a DVD-audio player, or a DVD-audio recorder.

5. The method of claim 4, wherein the dielectric material is substantially clear acrylic plastic.

6. The method of claim 5, wherein the lens body hemispheric inner surface is about ⅜ inch in diameter and the lens body hemispheric outer surface is about ½ inch in diameter.

\* \* \* \* \*